United States Patent
Kanamaru et al.

(10) Patent No.: US 12,494,014 B2
(45) Date of Patent: Dec. 9, 2025

(54) IMAGE GENERATING DEVICE, SHIP INFORMATION DISPLAYING METHOD AND A NON-TRANSITORY COMPUTER-READABLE MEDIUM

(71) Applicant: Furuno Electric Co., Ltd., Hyogo (JP)

(72) Inventors: Naohiro Kanamaru, Amagasaki (JP); Koji Nishiyama, Toyonaka (JP)

(73) Assignee: Furuno Electric Co., Ltd., Hyogo (JP)

( * ) Notice: Subject to any disclaimer, the term of this patent is extended or adjusted under 35 U.S.C. 154(b) by 145 days.

(21) Appl. No.: 18/401,095

(22) Filed: Dec. 29, 2023

(65) Prior Publication Data
US 2024/0135635 A1   Apr. 25, 2024
US 2024/0233248 A9   Jul. 11, 2024

Related U.S. Application Data

(63) Continuation-in-part of application No. PCT/JP2022/011353, filed on Mar. 14, 2022.

(30) Foreign Application Priority Data

Jun. 30, 2021 (JP) .................................. 2021-108298

(51) Int. Cl.
*G06T 15/20* (2011.01)
*B63B 49/00* (2006.01)
(Continued)

(52) U.S. Cl.
CPC ............ *G06T 15/205* (2013.01); *B63B 49/00* (2013.01); *G06T 19/20* (2013.01); *G08G 3/02* (2013.01);
(Continued)

(58) Field of Classification Search
None
See application file for complete search history.

(56) References Cited

U.S. PATENT DOCUMENTS 10,006,505 B2 *   6/2018   Lemay ............... G01C 21/3626
2015/0330803 A1 *   11/2015   Okuda ................... G01C 21/20
                                                                 701/538
(Continued)

FOREIGN PATENT DOCUMENTS

JP        2015215532 A     12/2015
JP    WO2018216535 A1      4/2020

OTHER PUBLICATIONS

ISA Japan Patent Office, International Search Report Issued in PCT Application No. PCT/JP2022/011353, May 10, 2022, WIPO, 2 pages.

*Primary Examiner* — Robert J Craddock
(74) *Attorney, Agent, or Firm* — Alleman Hall & Tuttle LLP

(57) ABSTRACT

The present disclosure provides an image generating device capable of making a situation around a ship comprehensive. The image generating device includes processing circuitry. The processing circuitry acquires ship data indicative of a two-dimensional position of a ship on a water surface. The processing circuitry places a three-dimensional ship object indicative of the ship, at a position of a virtual water surface in a virtual three-dimensional space corresponding to a two-dimensional position of the ship. The processing circuitry sets a virtual camera in a bird's-eye view mode in which the three-dimensional ship object is looked down obliquely from a position higher than the three-dimensional ship object. The processing circuitry generates a three-dimensional image in which a sight within a field of view of the virtual camera including the three-dimensional ship object is drawn. The processing circuitry generates an image for indication including the three-dimensional image.

18 Claims, 9 Drawing Sheets

(51) Int. Cl.
*G06T 19/20* (2011.01)
*G08G 3/02* (2006.01)

(52) U.S. Cl.
CPC .. *G06T 2200/24* (2013.01); *G06T 2219/2004* (2013.01)

(56) References Cited

U.S. PATENT DOCUMENTS

2020/0057488 A1* 2/2020 Johnson ................. G06T 19/20
2020/0278433 A1 9/2020 Vanhakartano et al.

* cited by examiner

SHIP MANAGEMENT DATABASE

| SHIP ID | THE-SHIP | SELECTION | DEGREE OF RISK | SOURCE | POSITION | DIRECTION | SHIP SPEED | SHIP TYPE | SHIP LENGTH |
|---|---|---|---|---|---|---|---|---|---|
| 001 | ○ | — | — | GPS/COMPASS | X1,Y1 | D1 | V1 | — | — |
| 002 | — | — | — | AIS | X2,Y2 | D2 | V2 | xxx | xxx |
| 003 | — | ○ | — | AIS/RADAR | X3,Y3 | D3 | V3 | xxx | xxx |
| 004 | — | — | — | RADAR | X4,Y4 | — | V4 | — | — |
| 005 | — | — | ○ | RADAR | X5,Y5 | D5 | V5 | xxx | xxx |
| 006 | — | — | — | CAMERA | X6,Y6 | — | — | xxx | — |
| 007 | — | — | — | CAMERA | X7,Y7 | D7 | V7 | xxx | xxx |

FIG. 5

IMAGE GENERATING DEVICE, SHIP INFORMATION DISPLAYING METHOD AND A NON-TRANSITORY COMPUTER-READABLE MEDIUM

CROSS-REFERENCE TO RELATED APPLICATION(S)

This application is a continuation-in-part application of PCT International Application No. PCT/JP2022/011353, which was filed on Mar. 14, 2022, and which claims priority to Japanese Patent Application No. JP2021-108298 filed on Jun. 30, 2021, the entire disclosures of each of which are herein incorporated by reference for all purposes.

TECHNICAL FIELD

The present disclosure relates to an image generating device, a ship information displaying method, and a program.

BACKGROUND ART

It is known that three-dimensional indication data for displaying graphic symbols indicative of additional indication information so as to be superimposed on an image of the water surface outputted from an imaging device is generated and rendered.

REFERENCE DOCUMENT(S) OF CONVENTIONAL ART

Patent Document

[Patent Document 1] WO2018/216535A1

DESCRIPTION OF THE DISCLOSURE

Problem(s) to be Solved by the Disclosure

Devices and methods for displaying such ship information are required to make the situation around a ship concerned more comprehensive.

One main purpose of the present disclosure is to provide an image generating device, a ship information displaying method, and a program, which are capable of making a situation around a ship comprehensive.

SUMMARY OF THE DISCLOSURE

In order to achieve the above-described purpose, an image generating device according to one aspect of the present disclosure includes a data acquiring part, a three-dimensional object placing part, a camera setting part, a three-dimensional image generating part, and an indication image generating part. The data acquiring part acquires ship data indicative of a two-dimensional position of a ship on a water surface. The three-dimensional object placing part places a three-dimensional ship object indicative of the ship, at a position of a virtual water surface in a virtual three-dimensional space corresponding to a two-dimensional position of the ship. The camera setting part sets a virtual camera in a bird's-eye view mode in which the three-dimensional ship object is looked down obliquely from a position higher than the three-dimensional ship object. The three-dimensional image generating part generates a three-dimensional image in which a sight within a field of view of the virtual camera including the three-dimensional ship object is drawn. The indication image generating part generates an image for indication including the three-dimensional image. According to this configuration, it becomes possible to make a situation around a ship comprehensive.

In the above-described aspect, the camera setting part may set a camera following mode in which the virtual camera is moved in association with movement of the three-dimensional ship object. According to this configuration, it becomes possible to continue to generate the three-dimensional image following the ship which is moving.

In the above-described aspect, the image generating device may further include an input accepting part which accepts an operational input for moving a viewpoint by a user. The camera setting part may change at least one of a three-dimensional position, an orientation, a viewing angle, and a magnifying power of the virtual camera according to the operational input for moving the viewpoint. According to this configuration, it becomes possible to display in the three-dimensional image an area which the user desires.

In the above-described aspect, when the operational input for moving the viewpoint is accepted, the camera setting part may change the mode from the camera following mode to a camera fixed mode in which the position of the virtual camera is fixed. According to this configuration, it becomes possible to maintain the indication of the area which the user desires.

In the above-described aspect, the input accepting part may accept an operational input for changing the viewpoint. The camera setting part may set the field of view of the virtual camera corresponding to the bird's-eye view mode, a top view mode in which the virtual water surface is looked down directly below from a position higher than the three-dimensional ship object, or a bridge view mode in which the virtual water surface is looked from a position corresponding to a control room of the three-dimensional ship object, according to the operational input for changing the viewpoint. According to this configuration, it becomes possible to display the three-dimensional image in a viewpoint which the user desires.

In the above-described aspect, when the operational input for changing the viewpoint is accepted, the camera setting part may change the mode from the camera fixed mode to the camera following mode. According to this configuration, it becomes possible to make the three-dimensional ship object follow the virtual camera in connection with the change of the viewpoint.

In the above-described aspect, the ship may include a first ship to which the image generating device is provided, and a second ship that travels around the first ship. The three-dimensional image generating part may display the three-dimensional ship object corresponding to the first ship and the three-dimensional ship object corresponding to the second ship discriminatingly from each other. According to this configuration, it becomes possible to easily discriminate the first ship and the second ship from each other.

In the above-described aspect, the image generating device may further include a two-dimensional image generating part which generates a two-dimensional image in which a two-dimensional ship object indicative of the ship is placed at a position corresponding to the two-dimensional position of the ship. The indication image generating part may generate the image for indication including the three-dimensional image and the two-dimensional image. According to this configuration, it becomes possible to make the situation around the ship comprehensive by using the three-dimensional image and the two-dimensional image.

In the above-described aspect, the two-dimensional image generating part may set a position corresponding to the two-dimensional position of the virtual camera as the center of the two-dimensional image. According to this configuration, it becomes possible to make the relationship between the three-dimensional image and the two-dimensional image comprehensive.

In the above-described aspect, the two-dimensional image generating part may discriminatingly display a corresponding area corresponding to a field of view of the virtual camera in the two-dimensional image. According to this configuration, it becomes possible to make the relationship between the three-dimensional image and the two-dimensional image comprehensive.

In the above-described aspect, the two-dimensional image generating part may update the corresponding area, when at least one of the three-dimensional position, the orientation, the viewing angle, and the magnifying power of the virtual camera is changed. According to this configuration, it becomes possible to make the change in the field of view of the virtual camera comprehensive in the two-dimensional image.

In the above-described aspect, the three-dimensional image generating part may discriminatingly display in the three-dimensional image a corresponding area corresponding to a display area of the two-dimensional image. According to this configuration, it becomes possible to make the relationship between the three-dimensional image and the two-dimensional image comprehensive.

In the above-described aspect, the three-dimensional image generating part may not display in the three-dimensional image the three-dimensional ship object corresponding to the ship outside the display area of the two-dimensional image. According to this configuration, it becomes possible to reduce a processing load by restricting the area corresponding to which the three-dimensional ship object are displayed in the three-dimensional image.

In the above-described aspect, the image generating device may further include an input accepting part which accepts an operational input for changing a display area by a user. The two-dimensional image generating part may change a display area of the two-dimensional image based on the operational input for changing the display area. According to this configuration, it becomes possible to display the area which the user desires in the two-dimensional image.

In the above-described aspect, when one of the three-dimensional ship object and the two-dimensional ship object is selected, the three-dimensional image generating part or the two-dimensional image generating part may discriminatingly display the other. According to this configuration, it becomes possible to make the relationship between the ships included in the three-dimensional image and the two-dimensional image comprehensive.

In the above-described aspect, the ship may include a first ship to which the image generating device is provided, and a second ship that travels around the first ship. The two-dimensional image generating part may display the two-dimensional ship object corresponding to the first ship and the two-dimensional ship object corresponding to the second ship discriminatingly from each other. According to this configuration, it becomes possible to easily discriminate the first ship and the second ship from each other.

In the above-described aspect, the ship may include a first ship to which the image generating device is provided, and a second ship that travels around the ship. At least one of the three-dimensional image generating part and the two-dimensional image generating part may discriminatingly display at least one of the three-dimensional ship object and the two-dimensional ship object corresponding to the second ship with a risk degree indicative of a collision risk of the first ship colliding the second ship being more than a threshold. According to this configuration, it becomes possible to make the collision risk easily recognizable.

In the above-described aspect, the image generating device may further include a warning part which warns when the second ship with the degree of risk being more than the threshold is not included in the three-dimensional image. According to this configuration, it becomes possible to make the collision risk easily recognizable.

In the above-described aspect, the three-dimensional image generating part may further make at least one of an electronic nautical chart, a scheduled route, a way point, a tidal current, and a collision risk area included in the three-dimensional image. According to this configuration, it becomes possible to make the situation around the ship more comprehensive.

In the above-described aspect, the ship data may further include a ship type or a ship length of the ship. The three-dimensional object placing part may place the three-dimensional ship object according to the ship type or the ship length. According to this configuration, it becomes possible to make it comprehensive how the ship is.

Further, a ship information displaying method according to another aspect of the present disclosure includes acquiring ship data indicative of a two-dimensional position of a ship on a water surface, placing a three-dimensional ship object indicative of the ship at a position of a virtual water surface in a virtual three-dimensional space, corresponding to the two-dimensional position of the ship, setting a virtual camera in a bird's-eye view mode in which the three-dimensional ship object is looked down obliquely from a position higher than the three-dimensional ship object, generating a three-dimensional image in which a sight within a field of view of the virtual camera including the three-dimensional ship object is drawn, and displaying, by a display device, an image for indication including the three-dimensional image. According to this configuration, it becomes possible to make the situation around the ship comprehensive.

Further, a program according to another aspect of the present disclosure causes a computer to execute processing which includes acquiring ship data indicative of a two-dimensional position of a ship on a water surface, placing a three-dimensional ship object indicative of the ship at a position of a virtual water surface in a virtual three-dimensional space, corresponding to the two-dimensional position of the ship, setting a virtual camera in a bird's-eye view mode in which the three-dimensional ship object is looked down obliquely from a position higher than the three-dimensional ship object, generating a three-dimensional image in which a sight within a field of view of the virtual camera including the three-dimensional ship object is drawn, and generating an image for indication including the three-dimensional image. According to this configuration, it becomes possible to make the situation around the ship comprehensive.

BRIEF DESCRIPTION OF DRAWINGS

FIG. 5 is a view illustrating one example of a ship management database.

MODES FOR CARRYING OUT THE DISCLOSURE

Hereinafter, one embodiment of the present disclosure is described with reference to the drawings.

Figure 1:
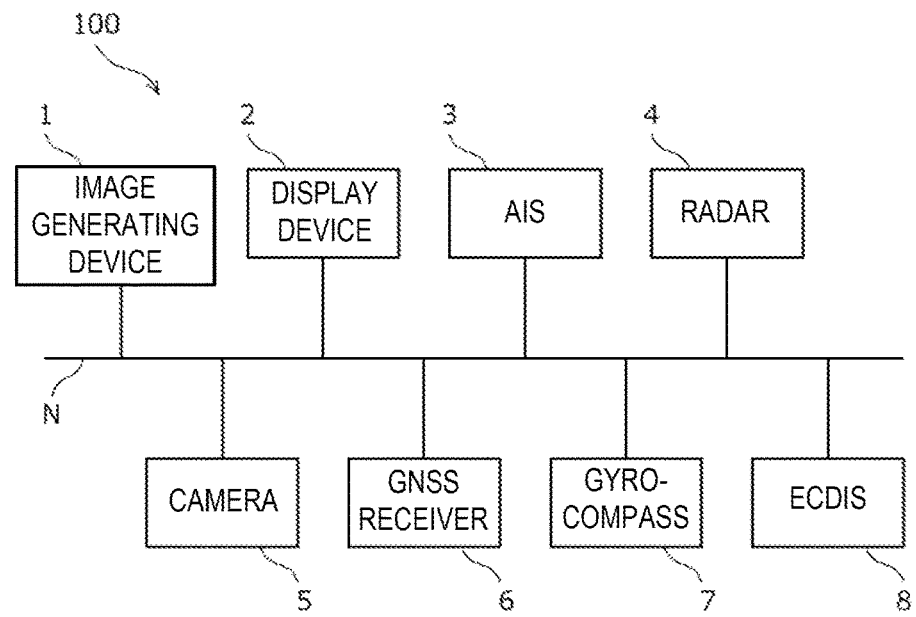
FIG. 1 is a view illustrating one example of a ship information display system.

FIG. 1 is a block diagram illustrating one example of a configuration of a ship information display system 100. The ship information display system 100 may be a system mounted on a ship. In the following description, the ship on which the ship information display system 100 is mounted is referred to as "the ship," and ship(s) other than the ship is referred to as "another ship" or "other ships."

The ship information display system 100 may include an image generating device 1, a display device 2, an MS 3, a radar 4, a camera 5, a GNSS receiver 6, a gyrocompass 7, and an ECDIS 8. These apparatuses may be connected to a network N, such as a LAN, so that mutual network communications are possible.

The image generating device 1 may be a computer including a CPU, a RAM, a ROM, a nonvolatile memory, and an input/output interface. The CPU of the image generating device 1 may perform information processing according to a program loaded to the RAM from the ROM or the nonvolatile memory.

The program may be supplied via an information storage medium, such as an optical disc or a memory card, or may be supplied via a communication network, such as the Internet or the LAN.

The display device 2 may display an image for indication generated by the image generating device 1. The display device 2 may be a display device, for example, with a touch sensor (which is a so-called "touch panel"). Other pointing devices, such as a trackball or a mouse, may also be used, instead of the touch sensor.

The AIS (Automatic Identification System) 3 may receive AIS data from another ship which exists around the ship, or a land control. A VDES (VHF Data Exchange System) may also be used instead of the AIS. The MS data may include an identification sign, a ship's name, a position, a course, a ship velocity, a ship type, a ship length, and a destination of another ship.

The radar 4 may transmit a radio wave around the ship, receive a reflection wave thereof, and generate echo data based on a reception signal. The radar 4 may discriminate a target object from the echo data, and generate Target-object Tracking data (TT data) indicative of a position and a velocity of the target object.

The camera 5 may be a digital camera which images the exterior from the ship to generate image data. The camera 5 may be installed in a bridge of the ship so as to be oriented, for example, toward the heading or the bow direction of the ship. The camera 2 may be a camera having a pan/tilt function and an optical zoom function (which is a so-called "PTZ camera").

Further, the camera 5 may also include an identifying part which identifies a position and a classification of the target object, such as a ship, included in the captured image by using an object detection model. The identifying part may be realized by another device, such as the image generating device 1, instead of the camera 5.

The GNSS receiver 6 may detect the position of the ship based on the radio wave received from a GNSS (Global Navigation Satellite System). The gyrocompass 7 may detect the heading of the ship. A GPS compass may also be used instead of the gyrocompass.

The ECDIS (Electronic Chart Display and Information System) 8 may acquire the position of the ship from the GNSS receiver 6, and display the position of the ship on an electronic nautical chart. Further, the ECDIS 9 may also display a scheduled route of the ship on the electronic nautical chart. A GNSS plotter may also be used instead of the ECDIS.

Although in this embodiment the image generating device 1 and the display device 2 are mutually-independent devices, the image generating device 1 and the display device 2 may also be an integrated device.

Further, the image generating device 1 may not be the independent device, but it may also be integrated with another device, such as the ECDIS 8. That is, the function of the image generating device 1 may be realized by another device, such as the ECDIS 8.

Moreover, the display device 2 may not be the independent device, but a display device provided to another device, such as the ECDIS 8, may be used as the display device 2 which displays the image generated by the image generating device 1.

Note that, although in this embodiment the image generating device 1 is mounted on a ship (the ship) to display the ship and other ships around the ship, its application is not limited to this. For example, the image generating device 1 may be installed in a land control, and may be used in order to display ships which travel a controlled ocean area.

Figure 2:
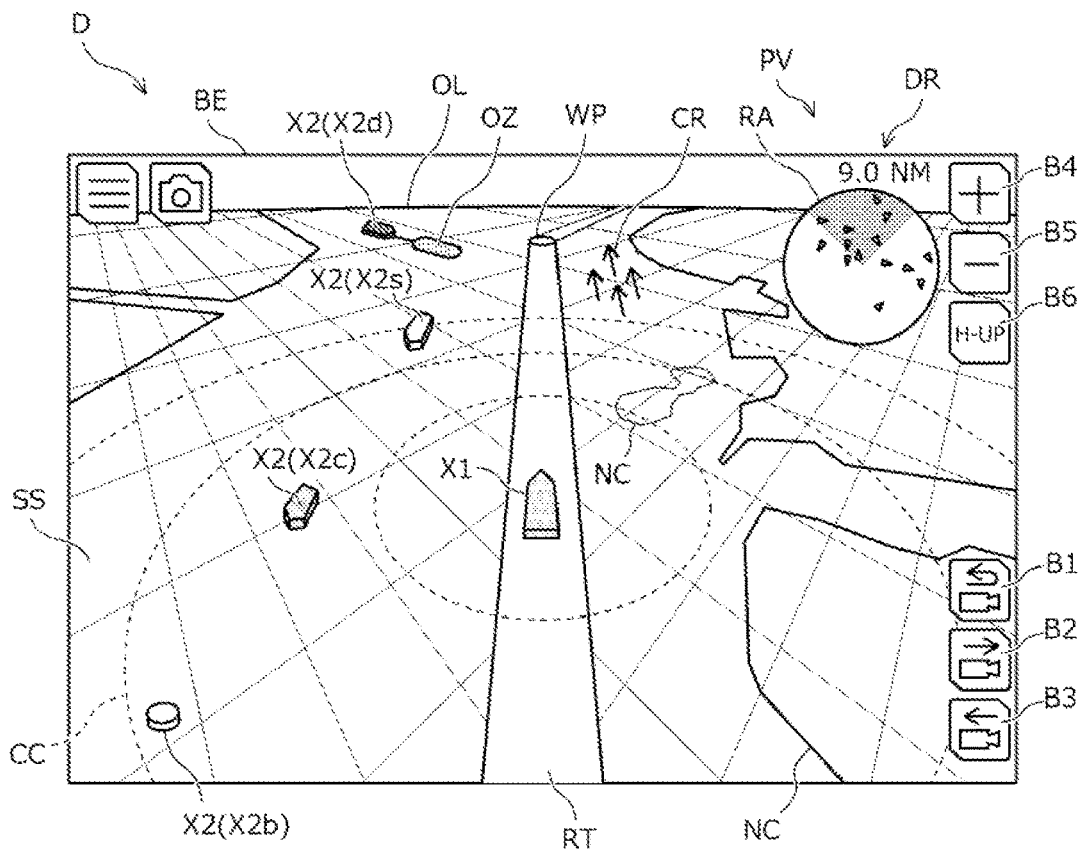
FIG. 2 is a view illustrating one example of an image for indication.
Figure 3:
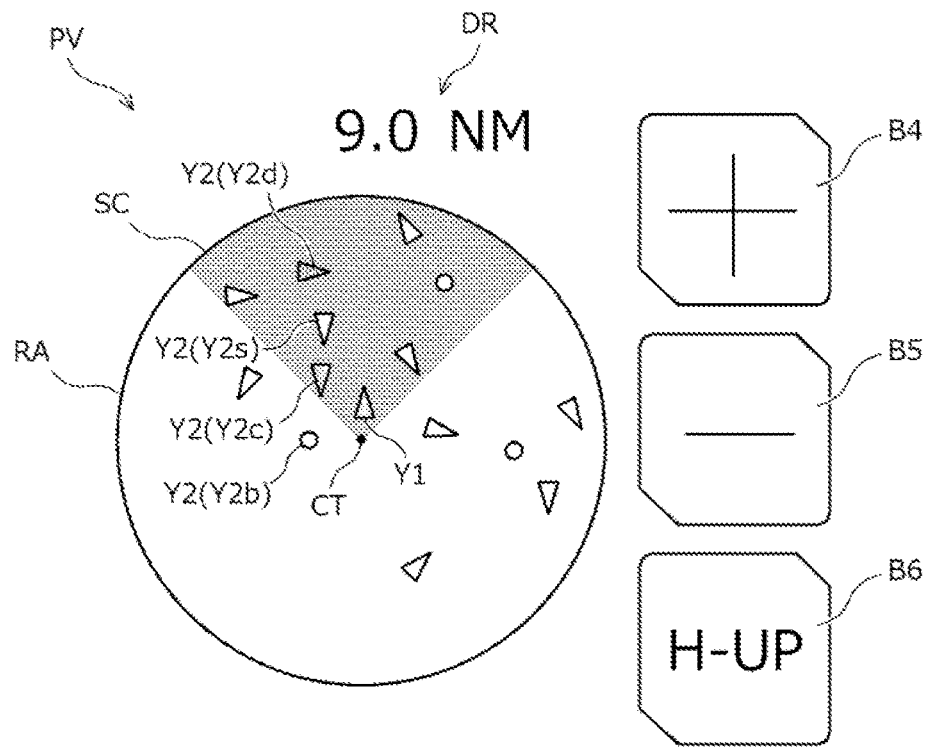
FIG. 3 is a view illustrating one example of a two-dimensional image.

FIG. 2 is a view illustrating one example of an indication image D which is generated by the image generating device 1 and displayed on the display device 2. FIG. 3 is an enlarged view illustrating one example of a two-dimensional image PV included in the indication image D. The indication image D may include a three-dimensional image BE and the two-dimensional image PV. Although in this embodiment the two-dimensional image PV is superimposed on an upper right part of the three-dimensional image BE, one of the three-dimensional image BE and the two-dimensional image PV may be placed next to the other.

The image generating device 1 may sequentially generate the indication image D at each timing based on ship data, and output video data including the time-series indication images D to the display device 2.

As illustrated in FIG. 2, the three-dimensional image BE may be a bird's-eye view image in which a virtual three-dimensional space where three-dimensional ship objects X are disposed on a virtual water surface SS is rendered so as to be seen from the bird's-eye viewpoint. The three-dimensional ship object X may include a three-dimensional ship object X1 indicative of the ship (hereinafter, referred to as "the-ship object X1"), and a three-dimensional ship object X2 indicative of another ship (hereinafter, referred to as "other-ships object X2").

The-ship object X1 and the other-ships object X2 may be displayed so as to be discriminable from each other. That is, the-ship object X1 and the other-ships object X2 are discriminable from each other, for example, by using mutually different colors, shapes, or textures.

The-ship object X1 may have a shape which imitates a ship. Concentric circles CC centering on the-ship object X1 may be displayed around the-ship object X1. A scale and a numerical value which indicate the direction (bearing) may be added to the outermost ring of the concentric circles CC.

Other-ships object X2 may have various shapes and sizes. Other-ships object X2 may include, for example, an other-ships object X2s having the shape which imitates a ship, and a button-shaped object X2b. The differences may be based on the source and the contents of the ship data as will be described later.

Further, among other-ships objects X2, an other-ships object X2c selected by a user's operational input may be displayed so as to be discriminable from the remaining other-ships objects X2.

Further, among other-ships objects X2, an other-ships object X2d with a risk degree indicative of a collision risk with the ship being more than a threshold may be displayed so as to be discriminable from the remaining other-ships objects X2.

In addition, the three-dimensional image BE may further include a nautical chart object NC indicative of a coastline, a safe depth contour, etc., a route object RT indicative of a scheduled route of the ship, a veering (change-course) point object WP indicative of a way point of the scheduled route, a current object CR indicative of tidal current, and a risk area object OZ indicative of a collision risk area, such as an OZT (Obstacle Zone by Target).

Further, a button B1 for changing for resetting the viewpoint position, a button B2 for advancing the viewpoint position, a button B3 for reversing (moving backward) the viewpoint position, etc. may be added to the three-dimensional image BE.

Moreover, in the three-dimensional image BE, a borderline OL for discriminatingly indicating a corresponding area corresponding to a display area RA of the two-dimensional image PV may be displayed. Based on the borderline OL, inside and outside of the corresponding area may be discriminable from each other. The ship objects X may not be displayed outside the borderline OL.

As illustrated in FIG. 3, the two-dimensional image PV may be a plane image in which a two-dimensional plane where two-dimensional ship objects Y are disposed is drawn. The two-dimensional image PV may have a circular display area RA, and the two-dimensional ship objects Y may be displayed inside the display area RA.

The two-dimensional ship object Y may include a two-dimensional ship object Y1 indicative of the ship (hereinafter, referred to as "the-ship object Y1"), and a two-dimensional ship object Y2 indicative of another ship (hereinafter, referred to as "other-ships object Y2").

The-ship object Y1 and the other-ships object Y2 may be displayed so as to be discriminable from each other, for example, by using mutually different colors etc. The-ship object Y1 may have a shape indicating the heading, such as an isosceles triangle or a boomerang shape (concave quadrangle).

Among other-ships objects Y2, some of other-ships objects, Y2s, may have the shape indicating the heading, similarly to the-ship object Y1. The remaining other-ships objects, Y2b, may have a circular shape. The differences may be based on the source and the contents of the ship data as will be described later.

Further, among other-ships objects Y2, an other-ships object Y2c selected by the user's operational input may be displayed so as to be discriminable from the remaining other-ships objects Y2.

Further, among other-ships objects Y2, an other-ships object Y2d with the risk degree indicative of the collision risk with the ship being more than the threshold may be displayed discriminable from the remaining other-ships objects Y2.

A center CT of the display area RA of the two-dimensional image PV may correspond to a two-dimensional position of the virtual camera in the three-dimensional image BE. Further, in the display area RA of the two-dimensional image PV, a fan-shaped corresponding area SC corresponding to a field of view of the virtual camera may be discriminatingly displayed.

Moreover, a text DR indicative of a corresponding distance corresponding to a radius of the display area RA, a button B4 for increasing the corresponding distance, a button B5 for decreasing the corresponding distance, and a button B6 for switching the direction (bearing) corresponding to the upward of the display area RA between the heading (H-UP) of the ship and the north (N-UP) may be added to the two-dimensional image PV.

Note that, although in this embodiment objects indicative of the coastline, the scheduled route, the way point, the tidal current, or the OZT are not displayed in the two-dimensional image PV, those objects may be displayed similarly to the three-dimensional image BE.

Below, a configuration and operation of the image generating device 1 which generates the indication image D is described.

Figure 4:
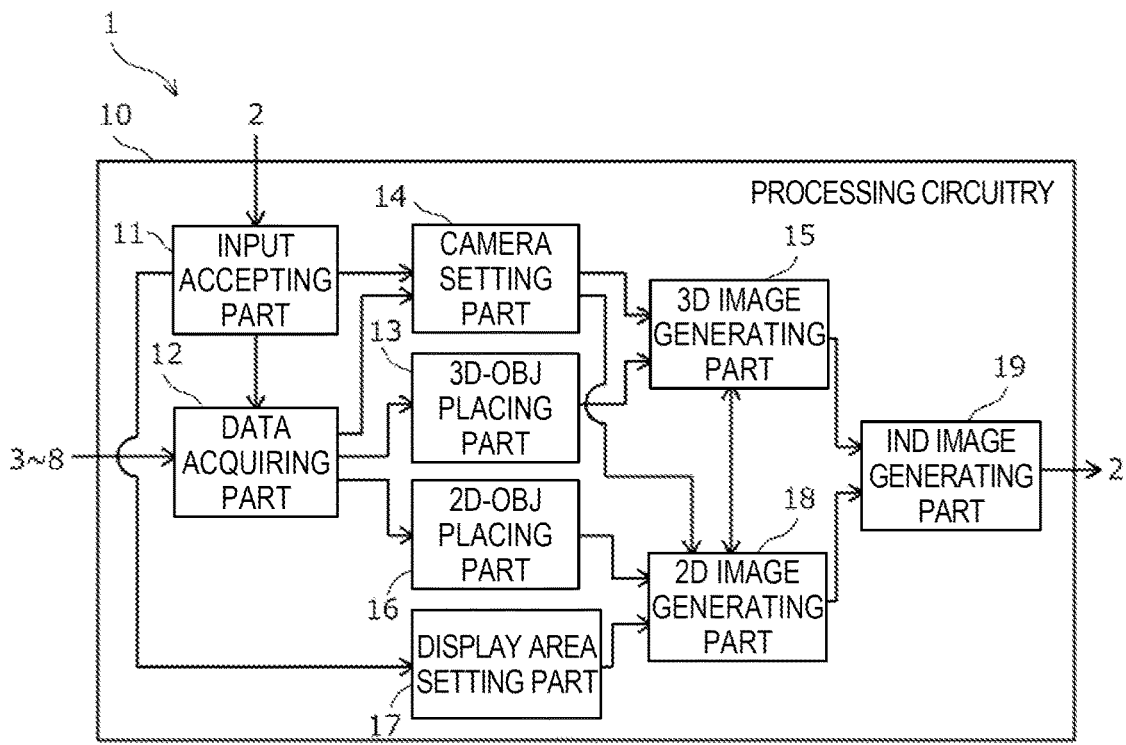
FIG. 4 is a view illustrating one example of an image generating device.

FIG. 4 is a block diagram illustrating one example of the configuration of the image generating device 1. The image generating device 1 may include an input accepting part 11, a data acquiring part 12, a three-dimensional object (3D-OBJ) placing part 13, a camera setting part 14, a three-dimensional image generating part 15, a two-dimensional object (2D-OBJ) placing part 16, a display area setting part 17, a two-dimensional image generating part 18, and an indication image generating part 19.

These functional parts may be realized by processing circuitry 10 (a controller 10) which is software or a CPU of the image generating device 1 performing information processing according to a program.

The three-dimensional object placing part 13, the camera setting part 14, and the three-dimensional image generating part 15 may be functional parts for generating the three-dimensional image BE. The two-dimensional object placing part 16, the display area setting part 17, and the two-dimensional image generating part 18 may be functional parts for generating the two-dimensional image PV. The indication image generating part 19 may be a functional part for synthesizing the three-dimensional image BE with the two-dimensional image PV to generate the indication image D.

The input accepting part 11 may accept an operational input by the user. In detail, the input accepting part 11 may acquire operational input data indicative of the user's operational input detected by the touch sensor of the display device 2, and interpret the contents of the instruction corresponding to the operational input.

The data acquiring part 12 may acquire ship data from other devices included in the ship information display system 100. Alternatively, the data acquiring part 12 may acquire ship data from the outside of the ship information display system 100, such as another ship or a land control, by communications. Further, information inputted by a sailor onboard or an observer on land via the input accepting part 11 may be acquired as ship data.

The ship data may include at least a two-dimensional position of a ship. The two-dimensional position of a ship may be expressed by two-dimensional coordinates of latitude and longitude. The ship data may also include a direction (bearing), a ship speed, a ship type, etc. of a ship.

In detail, the data acquiring part 12 may acquire the position of the ship detected by the GNSS receiver 6, and the heading of the ship detected by the gyrocompass 7 as ship data of the ship.

Further, the data acquiring part 12 may acquire the AIS data received by the AIS 3, the TT data generated by the radar 4, or identification data identified from the image captured by the camera 5 as ship data of another ship.

Among these, since the position of another ship included in the TT data and the identification data is expressed by a relative position with respect to the ship, it may be converted into an absolute position using the position of the ship detected by the GNSS receiver 6.

The data acquiring part 12 may manage ship data by using a ship management database established in the memory. FIG. 5 is a view illustrating one example of the ship management database.

As illustrated in FIG. 5, the ship management database may include fields of "ship ID," "the-ship," "selection," "degree of risk," "source," "position," "direction," "ship speed," "ship type," and "ship length." It may also include a navigation state, a destination, a Maritime Mobile Service Identity (MMSI), a ship's name, etc.

"The-ship" may indicate whether a ship is the ship or another ship. When the source of ship data is the GNSS receiver 6 and the gyrocompass 7, a value indicative of the ship may be inputted into the field of "the-ship." Further, when the source of the information of ship data is the AIS provided to the ship, the value indicative of the ship may be inputted into the field of "the-ship."

"Selection" may indicate whether a ship is selected by the user's operational input. When the ship object included in the three-dimensional image BE or the two-dimensional image PV is specified by the user, a value indicative of the selection may be inputted into the field of "selection" of the ship concerned.

"Degree of risk" may indicate whether the risk degree indicative of the collision risk of the ship and another ship colliding each other is more than the threshold. The image generating device 1 may acquire a calculation result of the collision risk from another device, or may calculate the collision risk by itself.

For the calculation of the collision risk, for example, a technique using TCPA (Time to Closest Point of Approach)/DCPA (Distance to Closest Point of Approach), a technique using SJ (Subject Judgment) value, or a technique for displaying an OZT (Obstacle Zone by Target) may be used.

"Source" may indicate a source of ship data. When the position of another ship indicated by ship data from one of the sources of the AIS 3, the radar 4, and the cameras 5 is the same as the position of another ship indicated by ship data of another source, since these ship data are related to common another ship, the records may be combined.

"Position" may indicate a two-dimensional position of a ship. The two-dimensional position of a ship may be expressed by two-dimensional coordinates of latitude and longitude. "Direction" may indicate the heading of a ship. "Ship speed" may indicate a speed of a ship. The ship speed may be used for interpolation until the position of a ship is updated. "Ship type" may indicate a type of a ship, such as a merchant ship or a fishing ship. "Ship length" may indicate the full length of a ship.

Note that, although ship data from the radar 4 does not fundamentally include the direction, the ship type, and the ship length, the direction may be estimated from a change in the position of a target object in the echo data, and the ship type or the ship length may be estimated from the image of a target object in the echo data.

Further, although ship data from the camera 5 does not fundamentally include the direction, the ship speed, and the ship length, the direction and the ship speed may be estimated from a change in the position of a target object in the camera image, and the ship length may also be estimated from the image of a target object in the camera image, in addition to the ship type.

Figure 6:
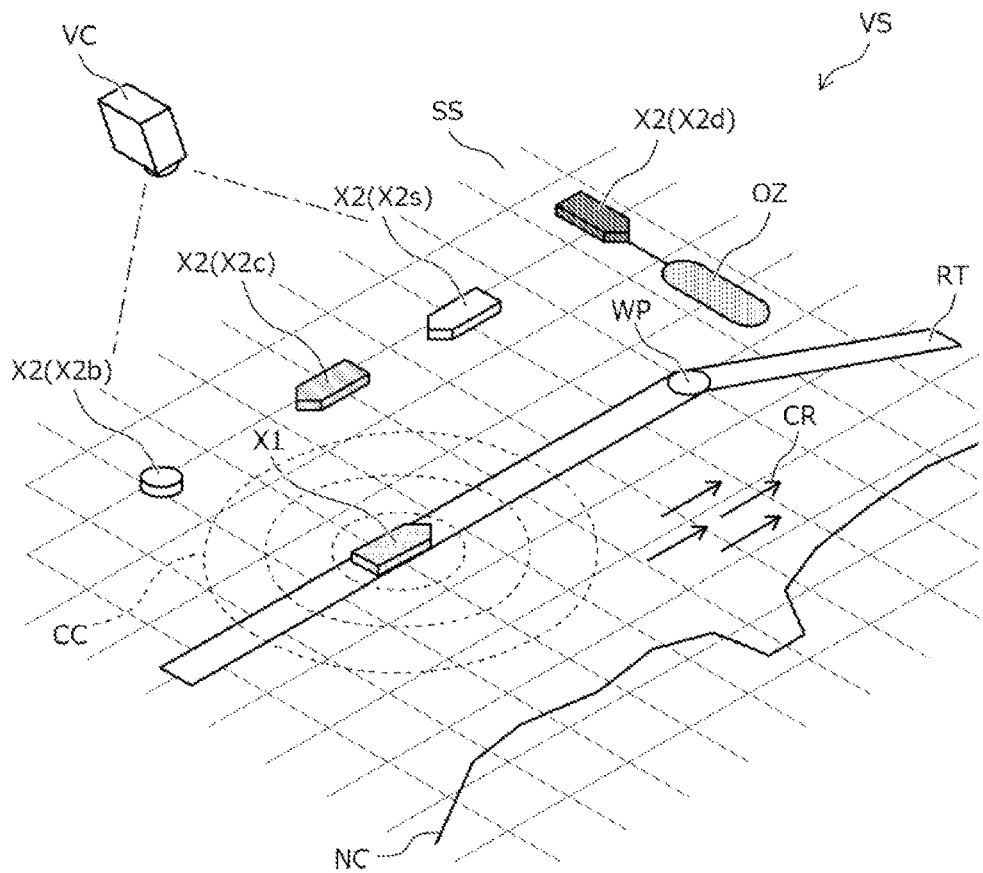
FIG. 6 is a view illustrating one example of a virtual three-dimensional space.

Returning to FIG. 4, a generation of the three-dimensional image BE by the three-dimensional object placing part 13, the camera setting part 14, and the three-dimensional image generating part 15 is described. FIG. 6 is a view illustrating one example of a virtual three-dimensional space VS.

The virtual three-dimensional space VS may have a coordinate system corresponding to the actual space (reality space). The height of the virtual water surface SS of the virtual three-dimensional space VS may correspond to the height of the water surface of the actual space (for example, 0m above sea level).

The three-dimensional object placing part 13 may place the three-dimensional ship object X at a position of the virtual water surface SS in the virtual three-dimensional space VS corresponding to the two-dimensional position of a ship, based on ship data acquired by the data acquiring part 12.

In detail, the three-dimensional object placing part 13 may place a the-ship object X1, in the orientation corresponding to the heading of the ship, at a position of the virtual water surface SS corresponding to the position of the ship, based on ship data of the ship including the position and the heading of the ship detected by the GNSS receiver 6 and the gyrocompass 7. The-ship object X1 may have a shape which imitates a ship, and which allows the user to easily grasp the heading at a glance.

Further, the three-dimensional object placing part 13 may place an other-ships object X2, based on ship data of another ship, at a position of the virtual water surface SS corresponding to the position of another ship.

In detail, when ship data, such as ship data from the AIS 3, includes the direction, the three-dimensional object placing part 13 may place an other-ships object X2s having the shape which imitates a ship, in the orientation corresponding to the heading. Further, when ship data includes the ship type or the ship length, the three-dimensional object placing part 13 may place an other-ships object X2s having the shape or the size according to the ship type or the ship length.

On the other hand, when ship data does not include the direction, like ship data from the radar 4 or the camera 5, the three-dimensional object placing part 13 may place a button-shaped other-ships object X2b. Thus, the three-dimensional object placing part 13 may change the mode of other-ships object X2 according to the source of ship data, or may change the mode of other-ships object X2 according to the detection reliability.

Further, the three-dimensional object placing part 13 may make the-ship object X1, other-ships object X2c which is selected by the user's operational input, or other-ships object X2d with the degree of risk being more than the threshold discriminable.

In addition, the three-dimensional object placing part 13 may place, based on the data from the ECDIS 8, the nautical chart object NC, the route object RT, the veering point object WP, the tidal current object CR, etc. Further, the three-dimensional object placing part 13 may place the risk area object OZ based on the calculation result of the collision risk.

The camera setting part 14 may set a virtual camera VC at a bird's-eye viewpoint in the virtual three-dimensional space VS. That is, the camera setting part 14 may set the virtual camera VC to a bird's-eye view mode in which the virtual water surface SS on which the three-dimensional ship objects X are placed is obliquely looked down from a position higher than the three-dimensional ship objects X.

As for the virtual camera VC, a default viewpoint position and a default viewing direction may be set so that the virtual camera VC is located above and rearward of the-ship object X1 (the opposite direction from the heading) and is oriented obliquely downward toward the heading. At this time, the-ship object X1 may be located at the center of the field of view of the virtual camera VC.

The camera setting part 14 may set a camera following mode in which the virtual camera VC is moved according to the movement of the-ship object X1. In detail, when the two-dimensional position of the ship included in ship data of the ship is updated, the camera setting part 14 may similarly update the two-dimensional position of the virtual camera VC.

The camera setting part 14 may make the virtual camera VC follow the-ship object X1 in the camera following mode so that the relative position and the relative posture with respect to the-ship object X1 are maintained. Therefore, the position of the-ship object X1 within the field of view of the virtual camera VC may be maintained.

The camera setting part 14 may also set a camera fixed mode in which the position of the virtual camera VC is fixed, and may switch the mode between the camera following mode and the camera fixed mode.

The camera setting part 14 may change the three-dimensional position, the orientation, the viewing angle, or the magnifying power of the virtual camera VC based on the user's operational input for moving the viewpoint accepted by the input accepting part 11. Therefore, the sight within the field of view of the virtual camera VC may change.

For example, the camera setting part 14 may change the three-dimensional position, the orientation, the viewing angle, or the magnifying power of the virtual camera VC according to a gesture of finger(s) of the user who touches the screen of the display device 2. Further, the camera setting part 14 may move the virtual camera VC according to depression of the buttons B1-B3 (see FIG. 2) added to the three-dimensional image BE.

The three-dimensional image generating part 15 may generate the three-dimensional image BE by drawing or rendering the sight within the field of view of the virtual camera VC, which includes the-ship object X1, other-ships object(s) X2, and other objects.

Note that, in the three-dimensional image BE, the three-dimensional image generating part 15 may not display the three-dimensional ship object X outside the borderline OL (see FIG. 2) corresponding to the display area RA of the two-dimensional image PV. Alternatively, the three-dimensional object placing part 13 may not place the three-dimensional ship object(s) X outside the borderline OL.

Next, a generation of the two-dimensional image PV by the two-dimensional object placing part 16, the display area setting part 17, and the two-dimensional image generating part 18 is described.

The two-dimensional object placing part 16 may place the two-dimensional ship object Y at a position corresponding to the two-dimensional position of a ship of the two-dimensional plane, based on ship data acquired by the data acquiring part 12.

In detail, the two-dimensional object placing part 16 may place the-ship object Y1 in the orientation corresponding to the heading of the ship, at the position of the two-dimensional plane corresponding to the position of the ship, based on ship data of the ship including the position and the heading of the ship detected by the GNSS receiver 6 and the gyrocompass 7.

Further, the two-dimensional object placing part 16 may place an other-ships object Y2 at the position of the two-dimensional plane corresponding to the position of another ship, based on ship data of another ship.

In detail, when ship data includes the direction, like ship data from the MS 3, the two-dimensional object placing part 16 may place an other-ships object Y2s having the shape indicating the heading, in the orientation corresponding to the heading of another ship.

On the other hand, when ship data does not include the direction, like ship data from the radar 4 or the camera 5, the two-dimensional object placing part 16 may place an other-ships object Y2b having the circular shape.

Further, the two-dimensional object placing part 16 may make the-ship object Y1, other-ships object(s) Y2c which is selected by the user's operational input, or other-ships object(s) Y2d with the degree of risk being more than the threshold discriminable.

The display area setting part 17 may set the display area RA of the two-dimensional image PV so that the center CT of the display area RA of the two-dimensional image PV corresponds to the two-dimensional position of the virtual camera VC in the virtual three-dimensional space VS.

Further, the display area setting part 17 may change the display area RA of the two-dimensional image PV based on the user's operational input accepted by the input accepting part 11. For example, the display area setting part 17 may change the corresponding distance corresponding to the display area RA according to the depression of the buttons B4-B6 added to the two-dimensional image PV (see FIG. 3), or the touch gesture on the screen of the display device 2.

The two-dimensional image generating part 18 may generate the two-dimensional image PV by drawing the part, corresponding to the display area RA set by the display area setting part 17, of the two-dimensional plane where the-ship object Y1 and other-ships object(s) Y2 are placed by the two-dimensional object placing part 16.

Further, in the two-dimensional image PV, the two-dimensional image generating part 18 may discriminatingly display the corresponding area SC corresponding to the field of view of the virtual camera VC set by the camera setting part 14. This corresponding area SC may be updated in connection with a change in the three-dimensional position, the orientation, the viewing angle, or the magnifying power of the virtual camera VC.

The indication image generating part 19 may generate the indication image D by synthesizing the three-dimensional image BE generated in the three-dimensional image generating part 15 with the two-dimensional image PV generated by the two-dimensional image generating part 18. The indication image generating part 19 may output video data including the time-series indication image D to the display device 2.

Below, concrete processing of the ship information displaying method according to one embodiment, which is realized by the image generating device 1 is described.

Figure 7:
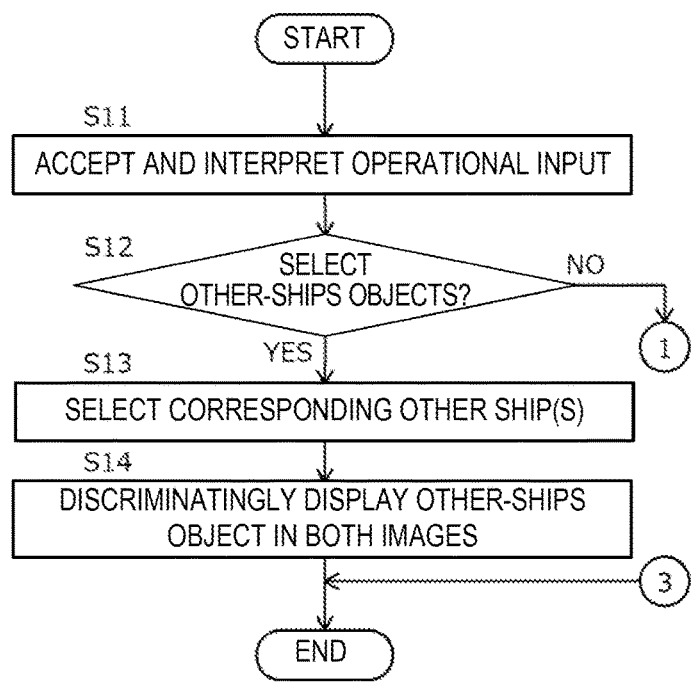
FIG. 7 is a view illustrating one example of a ship information displaying method.
Figure 8:
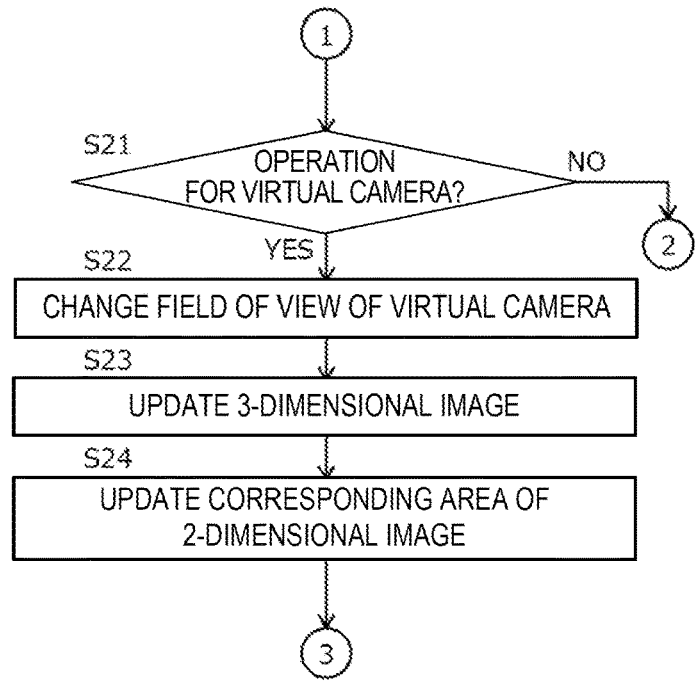
FIG. 8 is a view continued from FIG. 7.
Figure 9:
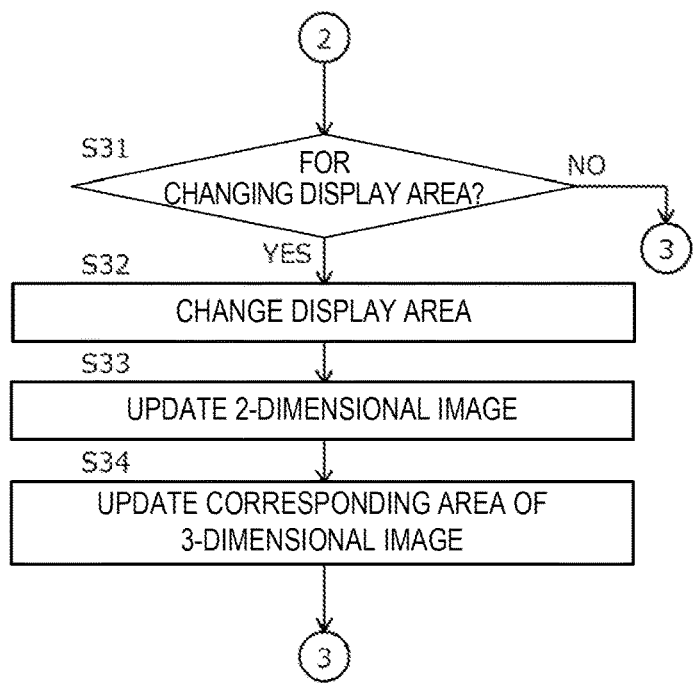
FIG. 9 is a view continued from FIG. 8.

FIGS. 7 to 9 are flowcharts illustrating one example of a procedure of processing performed by the image generating device 1 when the image generating device 1 may accept the operational input. The image generating device 1 may perform a series of processings illustrated in these drawings according to the program.

As illustrated in FIG. 7, when the image generating device 1 accepts the user's operational input, it may first interpret the contents of the instruction corresponding to the operational input (S11: processing as the input accepting part 11). The operational input may be detected, for example, by the touch sensor of the display device 2. The operational input may include, for example, operation for selecting other-ships objects X2 and Y2, operation for changing the position etc. of the virtual camera VC, and operation for changing the display area RA of the two-dimensional image PV.

Next, the image generating device 1 may determine whether the operational input is an operation for selecting other-ships objects X2 and Y2 (S12). The selection of an other-ships object may include, for example, a selection of an other-ships object X2 in the three-dimensional image BE, and a selection of an other-ships object Y2 in the two-dimensional image PV.

If the operational input is an operation for selecting other-ships objects X2 and Y2 (S12: YES), the image generating device 1 may change the other ships into a selected state (S13: processing as the data acquiring part 12). In detail, in the ship management database (see FIG. 5), the image generating device 1 may give a value indicative of the selection to the other ships selected by the user's operational input.

Next, in both the three-dimensional image BE and the two-dimensional image PV, the image generating device 1 may discriminatingly display the selected other-ships objects X2 and Y2, that is, perform a highlighted indication (S14: processing as the three-dimensional image generating part 15 and the two-dimensional image generating part 18).

For example, when other-ships object X2 is selected in the three-dimensional image BE, the selected other-ships object X2 may be discriminatingly displayed in the three-dimensional image BE, and other-ships object Y2 corresponding to the selected other-ships object X2 may also be discriminatingly displayed in the two-dimensional image PV.

Further, when the other-ships object Y2 is selected in the two-dimensional image PV, the selected other-ships object Y2 may be discriminatingly displayed in the two-dimensional image PV, and the other-ships object X2 corresponding to the selected other-ships object Y2 may also be discriminatingly displayed in the three-dimensional image BE.

Note that, alternatively, when an other-ships object is selected in one of the three-dimensional image BE and the two-dimensional image PV, the other-ships object may be discriminatingly displayed only in the other of the three-dimensional image BE and the two-dimensional image PV.

On the other hand, if the operational input is not an operation for selecting other-ships objects X2 and Y2 (S12: NO), the image generating device 1 may transit to processing illustrated in FIG. 8.

As illustrated in FIG. 8, next, the image generating device 1 may determine whether the operational input is an operation for changing the position etc. of the virtual camera VC (S21). The operation for changing the position etc. of the virtual camera VC may be, for example, an operation for changing the three-dimensional position, the orientation, the viewing angle, the magnifying power, etc. of the virtual camera VC.

If the operational input is an operation for changing the position etc. of the virtual camera VC (S21: YES), the image generating device 1 may change the field of view of the virtual camera VC according to the operation (S22: processing as the camera setting part 14), and update the three-dimensional image BE (S23: processing as the three-dimensional image generating part 15).

Further, the image generating device 1 may update the corresponding area SC corresponding to the field of view of the virtual camera VC displayed in the two-dimensional image PV, according to the change in the field of view of the virtual camera VC (S24: processing as the two-dimensional image generating part 18).

On the other hand, if the operational input is not an operation for changing the position etc. of the virtual camera VC (S21: NO), the image generating device 1 may transit to processing illustrated in FIG. 9.

As illustrated in FIG. 9, next, the image generating device 1 may determine whether the operational input is an operation for changing the display area RA of the two-dimensional image PV (S31). The operation for changing the display area RA of the two-dimensional image PV may be, for example, depression of the button (see FIG. 3) added to the two-dimensional image PV.

If the operational input is an operation for changing the display area RA of the two-dimensional image PV (S31: YES), the image generating device 1 may change the display area RA according to the operation (S32: processing as the display area setting part 17), and update the two-dimensional image PV (S33: processing as the two-dimensional image generating part 18).

Further, the image generating device 1 may also update the borderline OL (see FIG. 2) corresponding to the display area RA displayed in the three-dimensional image BE according to the change in the display area RA (S34: processing as the three-dimensional image generating part 15). At this time, the other-ships object X2 which has been located outside the borderline OL may no longer be displayed in the three-dimensional image BE, and the other-ships object X2 which has been located inside the borderline OL may newly be displayed in the three-dimensional image BE.

As described above, the series of processings performed when the operational input is accepted may be finished.

Figure 10:
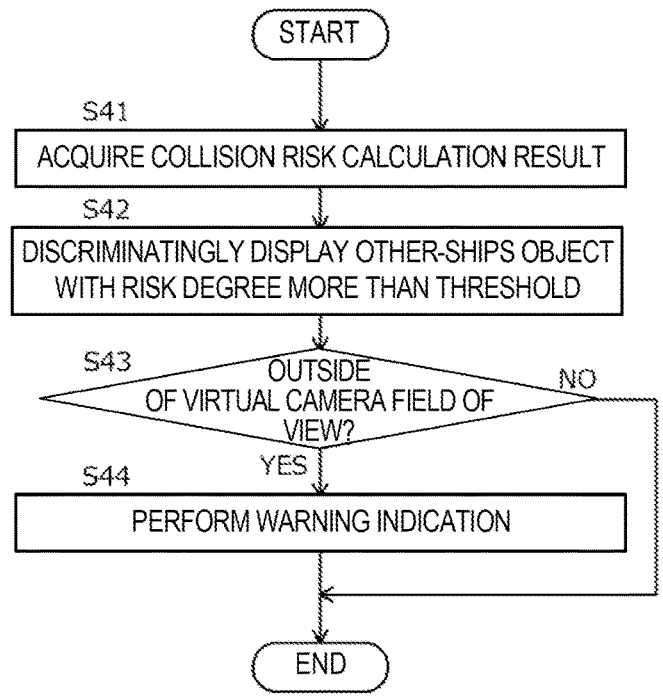
FIG. 10 is a view illustrating another example of the ship information displaying method.

FIG. 10 is a flowchart illustrating one example of a procedure of processing performed by the image generating device 1 when the image generating device 1 acquires the calculation result of the collision risk. The image generating device 1 may perform a series of processings illustrated in this drawing according to the program.

As illustrated in FIG. 10, first, the image generating device 1 may acquire the calculation result of the collision risk (S41). The image generating device 1 may acquire the calculation result of the collision risk from other devices, or may calculate the collision risk by itself.

Next, the image generating device 1 may discriminatingly display other-ships objects X2d and Y2d with the degree of risk indicative of the collision risk being more than the threshold in both the three-dimensional image BE and the two-dimensional image PV (S42: processing as the three-dimensional image generating part 15 and the two-dimensional image generating part 18).

Next, in the three-dimensional image BE, the image generating device 1 may determine whether other-ships object X2d with the degree of risk being more than the threshold is outside the field of view of the virtual camera VC (S43: processing as the camera setting part 14).

If other-ships object X2d with the degree of risk being more than the threshold is outside the field of view of the virtual camera VC (S43: YES), the image generating device 1 may perform a warning indication (S44: processing as a warning part). The warning indication may be realized, for example, by blinking the screen of the display device 2 in a warning color, such as red. Alternatively, the warning may be performed by sound or vibration.

As described above, the series of processings performed when the calculation result of the collision risk is acquired may be finished.

Below, other examples of the embodiment will be described. The detailed description of configurations which overlap with the above embodiment will be omitted by assigning the same reference characters.

Figure 11:
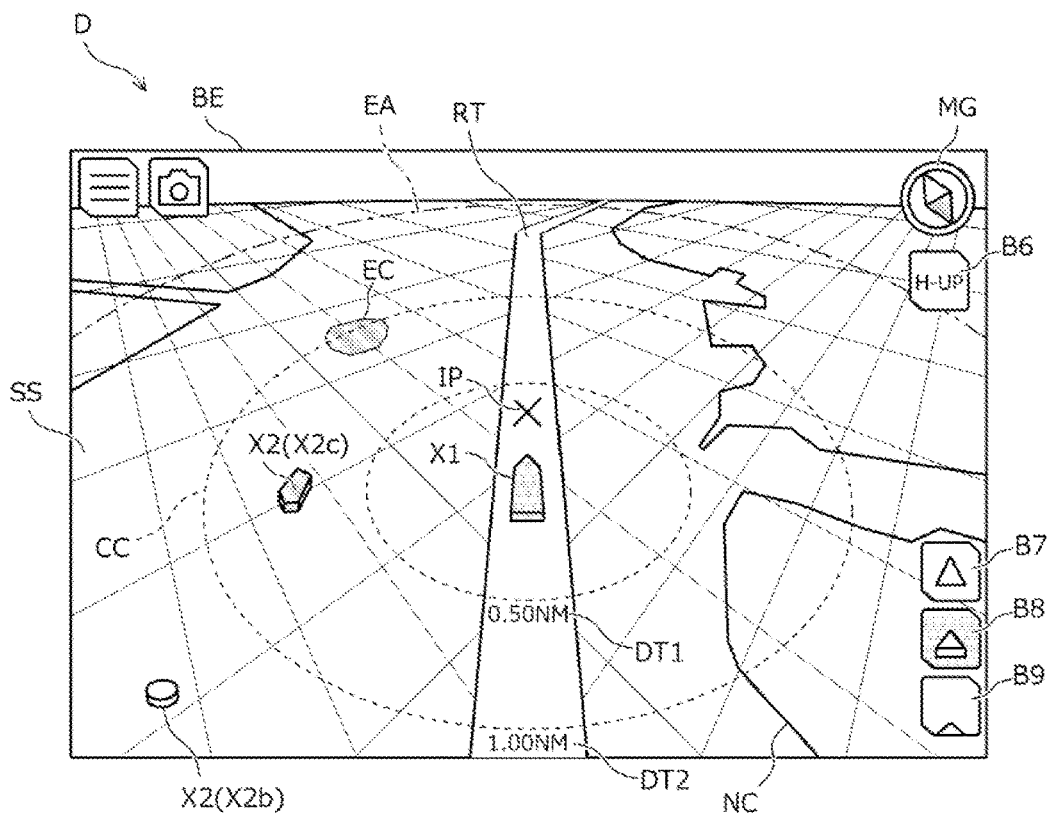
FIG. 11 is a view illustrating one example of the image for indication.

FIG. 11 is a view illustrating another example of the indication image D. The indication image D may include the three-dimensional image BE. Note that the indication image D may not include the two-dimensional image PV described above (see FIGS. 2 and 3).

The three-dimensional image BE may include texts DT1 and DT2 indicative of the distances corresponding to the radii of the concentric circles CC centering on the-ship object X1. Further, the three-dimensional image BE may include a mark IP indicative of an intersection between the line of sight of the virtual camera VC and the virtual water surface SS. Further, the three-dimensional image BE may include an echo object EC indicative of an area where the echo intensity detected by the radar 4 is more than a given value. Further, the three-dimensional image BE may include a range circle EA indicative of the detection range of the radar 4.

The three-dimensional image BE may include a compass object MG indicative a given direction, such as North or South, like a compass. The compass object MG may be adjusted, in order to help the user to intuitively grasp the direction, so that it indicates a direction which is obtained by synthesizing the direction on the virtual water surface SS with the horizontal component of the line of sight of the virtual camera VC. For example, the direction indicated by the compass object MG may be shifted in the viewing direction of the virtual camera VC from the direction on the virtual water surface SS as the angle of depression of the virtual camera VC becomes smaller.

Figure 12:
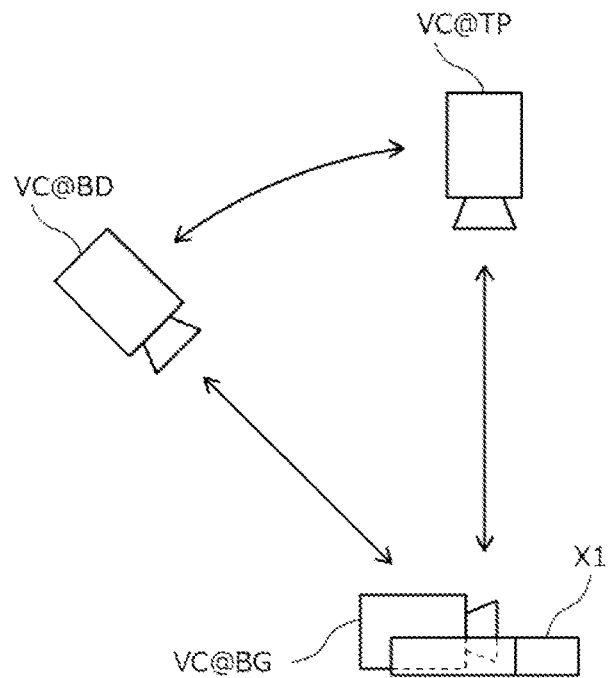
FIG. 12 is a view illustrating one example of a viewpoint change.

Further, the three-dimensional image BE may include buttons B7-B9 for changing the viewpoint. As illustrated in FIG. 12, the viewpoint of the virtual camera VC can be changed between a top view mode TP, a bird's-eye view mode BD, and a bridge view mode BG.

The button B7 may be a button for changing the view to the top view mode TP, the button B8 may be a button for changing the view to the bird's-eye view mode BD, and the button B9 may be a button for changing the view to the bridge view mode BG.

In the top view mode TP, the virtual camera VC may be set so that it looks down the-ship object X1 directly below from a position higher than the-ship object X1.

In the bird's-eye view mode BD, the virtual camera VC may be set so that it looks down the-ship object X1 obliquely from a position higher than the-ship object X1, as described above.

In the bridge view mode BG, the virtual camera VC may be set so that it looks at the virtual water surface SS from a position corresponding to the control room of the-ship object X1. For example, the virtual camera VC may be set so that it is oriented in the moving direction from the height of an upper surface of the-ship object X1.

Figure 13:
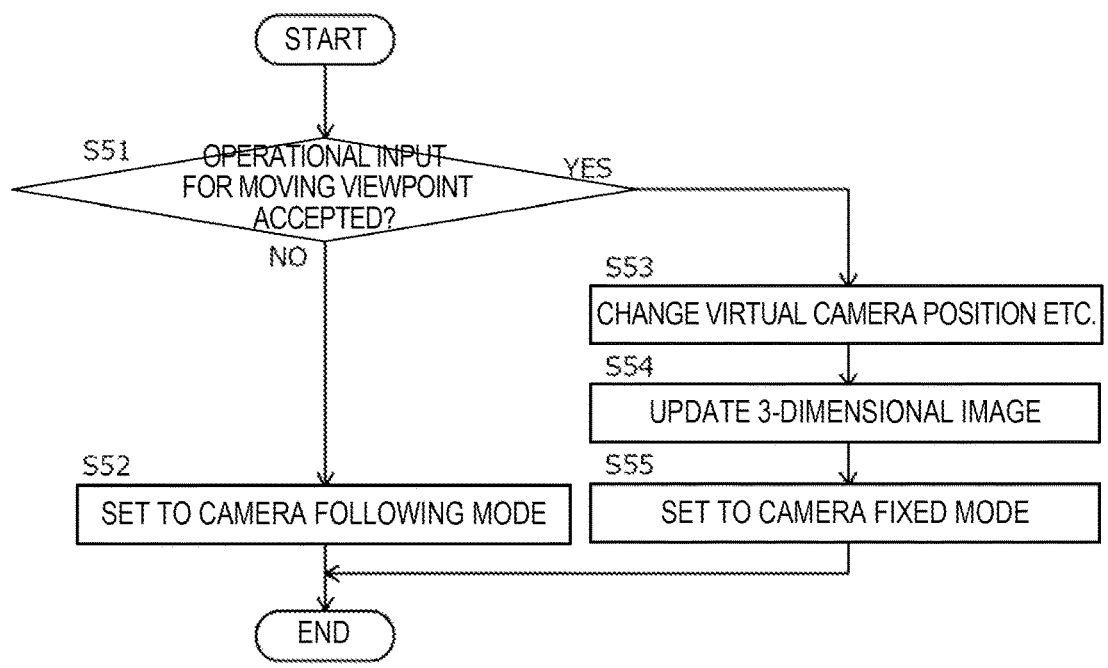
FIG. 13 is a view illustrating one example of the ship information displaying method.

FIG. 13 is the flowchart illustrating one example of a procedure of processing performed by the image generating device 1 when the image generating device 1 (the input accepting part 11 thereof) accepts the operational input for moving the viewpoint. The operational input for moving the viewpoint may be similar to the operational input for changing the position etc. of the virtual camera VC described above, and, for example, it may be accepted according to the touch gesture to the screen of the display device 2 or the depression of the buttons B1-B3 (see FIG. 2).

Before the operational input for moving the viewpoint is accepted (S51: NO), the image generating device 1 may set the mode to the camera following mode in which the virtual camera VC is moved in association with the movement of the-ship object X1 (S52: processing as the camera setting part 14).

If the operational input for moving the viewpoint is accepted (S51: YES), the image generating device 1 may change the three-dimensional position, the orientation, the viewing angle, or the magnifying power of the virtual camera VC according to the operational input (S53: processing as the camera setting part 14), and update the three-dimensional image BE (S54: processing as the three-dimensional image generating part 15).

Further, the image generating device 1 may change the mode setting from the camera following mode into the camera fixed mode in which the position of the virtual camera VC is fixed (S55: processing as the camera setting part 14). Therefore, it becomes possible to maintain the indication of the area which the user desires.

Figure 14:
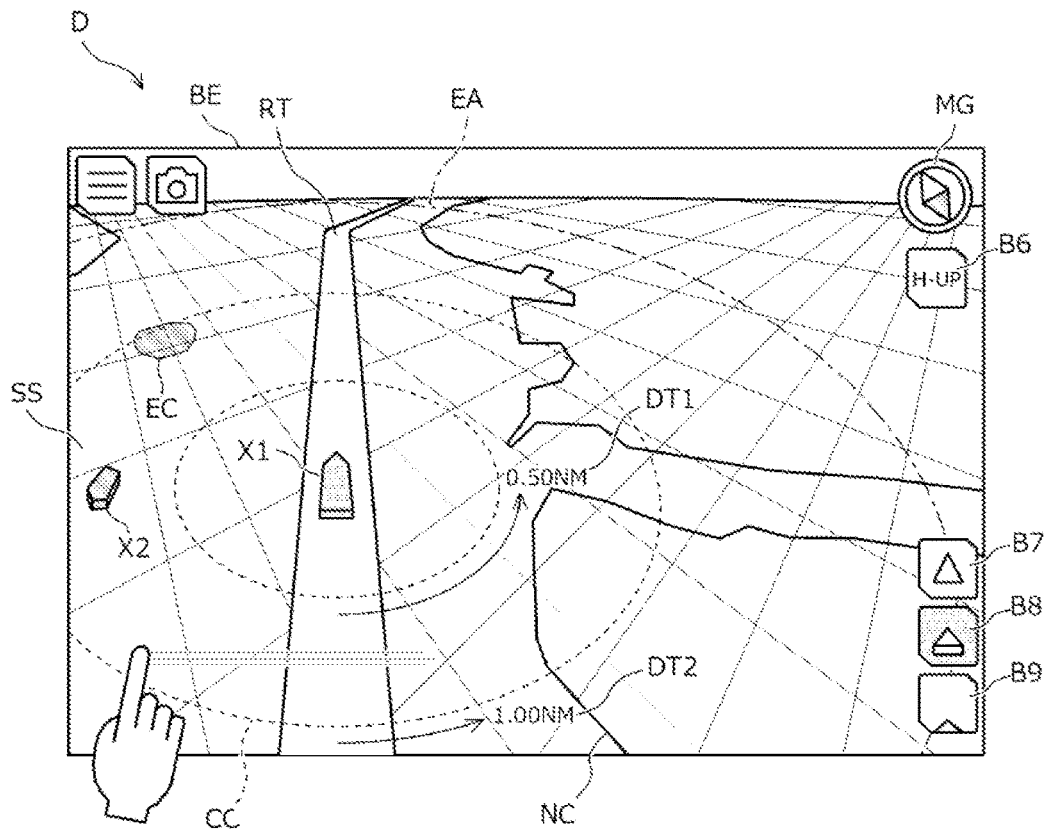
FIG. 14 is a view illustrating one example of the image for indication.

FIG. 14 is a view illustrating one example of indication when the operational input for moving the viewpoint is accepted. As illustrated in this drawing, for example, when the finger which touches the screen of the display device 2 moves leftward, the image generating device 1 may move the virtual camera VC rightward. As a result, each image in the indication image D may move leftward.

Further, when moving the virtual camera VC, the image generating device 1 (the three-dimensional object placing part 13 thereof) may move the texts DT1 and DT2 indicative of the distances of the concentric circles CC surrounding the-ship object X1 so that the texts DT1 and DT2 approach the center of the indication image D. Therefore, it becomes possible to bring the texts DT1 and DT2 closer to positions which are easily visible.

Figure 15:
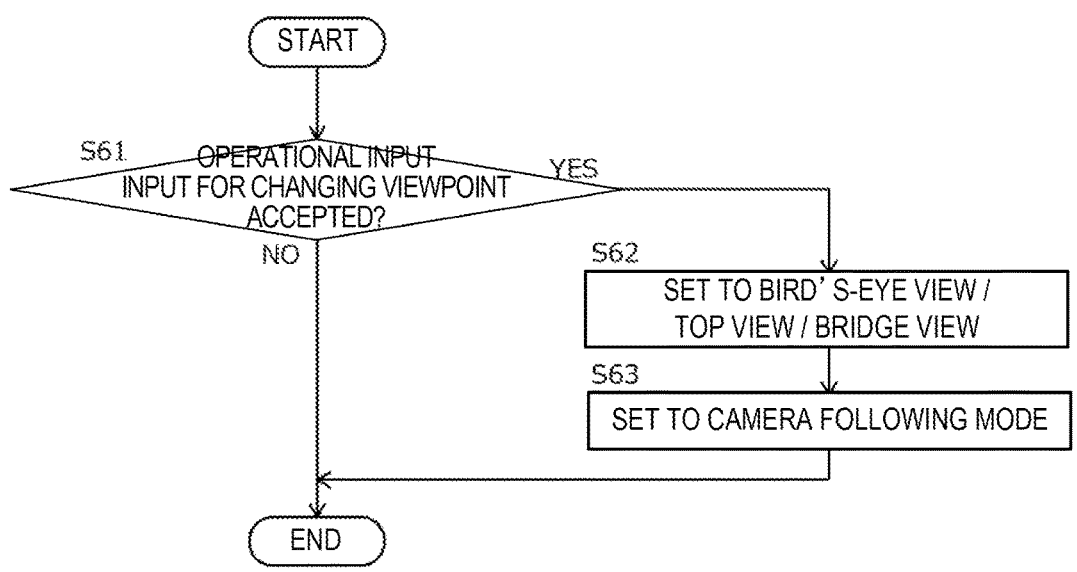
FIG. 15 is a view illustrating one example of the ship information displaying method.

FIG. 15 is a flowchart illustrating one example of a procedure of processing performed by the image generating device 1 when the image generating device 1 accepts the operational input for changing the viewpoint. The operational input for changing the viewpoint may be accepted, for example, according to the buttons B7-B9 (see FIG. 11) for changing the viewpoint, or the touch gesture to the screen of the display device 2.

If the operational input for changing the viewpoint is accepted (S61: YES), the image generating device 1 may set the field of view of the virtual camera VC to a mode selected by the operational input from the bird's-eye view mode BD, the top view mode TP, and the bridge view mode BG (see FIG. 12) (S62: processing as the camera setting part 14).

In detail, in the bird's-eye view mode BD, the top view mode TP, or the bridge view mode BG, the position, the orientation, the viewing angle, the magnifying power, etc. of the virtual camera VC with respect to the-ship object X1 may be defined beforehand, and the field of view of the virtual camera VC may be changed according to the mode selected by the operational input.

Further, after the viewpoint is changed, the image generating device 1 may change the setting into the camera following mode (S63: processing as the camera setting part 14). That is, when the viewpoint is changed in the camera following mode, the image generating device 1 may maintain the camera following mode as it is, and when the viewpoint is changed in the camera fixed mode, it may change the setting into the camera following mode.

Figure 16:
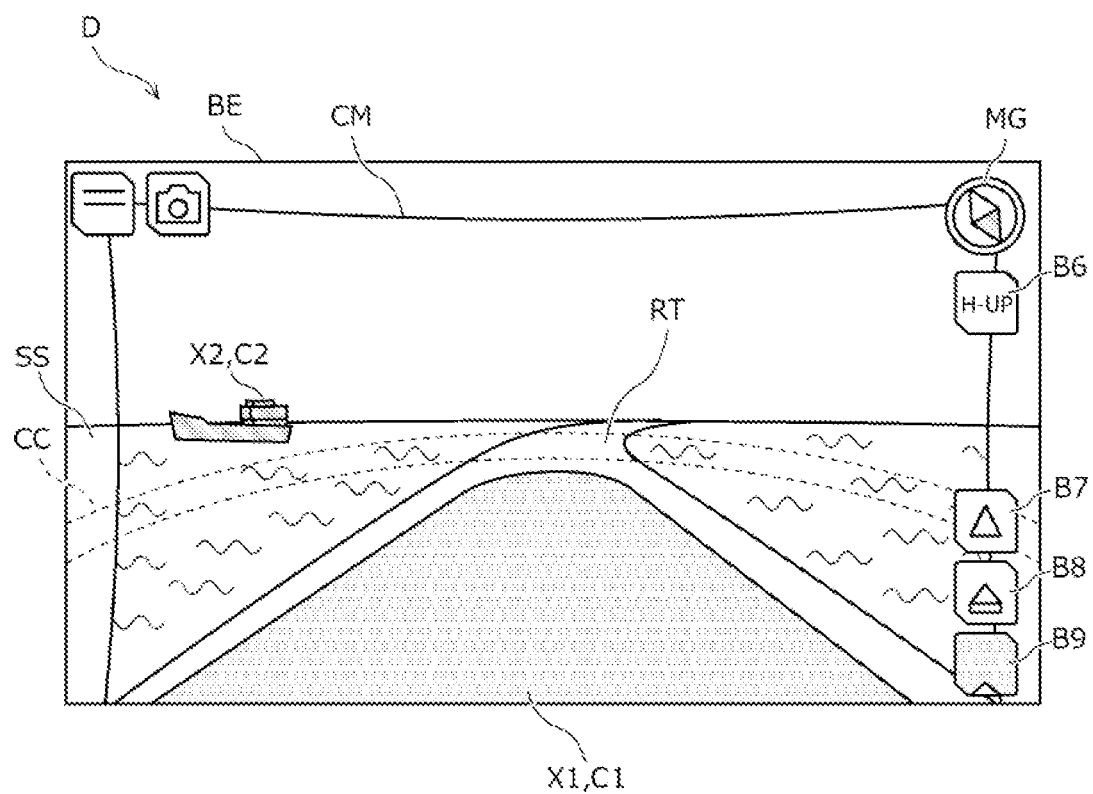
FIG. 16 is a view illustrating one example of the image for indication.

FIG. 16 is a view illustrating one example of indication when the bridge view mode BG is selected. In the bridge view mode BG, the indication image D may further include the camera image CM which is superimposed on the three-dimensional image BE. The camera image CM may be generated by a camera (not illustrated) which is installed in the ship and images the front of the ship.

In the indication image D in which the camera image CM is superimposed on the three-dimensional image BE, the-ship object X1 may be superimposed on an image C1 of the ship in the camera image CM, and other-ships object X2 may be superimposed on an image C2 of another ship in the camera image CM. At this time, the-ship object X1 and other-ships object X2 may be objects having transparency.

Further, when the virtual three-dimensional space to be displayed is more than a given range, the image generating device 1 (the three-dimensional image generating part 15 thereof) may display the three-dimensional ship object X in a given size, and when the virtual three-dimensional space to be displayed is less than the given range, it may display the three-dimensional ship object X in a size according to the ship type and the ship length of the target ship.

In detail, when the height of the virtual camera from the water surface or the distance between the virtual camera and three-dimensional ship object X is less than a given value, and the information on the ship type and the ship length is acquired from the AIS, the three-dimensional ship object X may be displayed in the size according to the ship length. On the other hand, when not satisfying these conditions, the three-dimensional ship object X may be displayed in the given size.

Alternatively, the image generating device 1 (three-dimensional image generating part 15 thereof) may change the space projection method which is used for generating the three-dimensional image, according to the viewpoint of the virtual camera VC.

In detail, when the viewpoint of the virtual camera VC is in the top view mode TP, it may generate the three-dimensional image by a parallel projection method, and when the viewpoint is other than this viewpoint, it may generate the three-dimensional image by a perspective projection method. Note that the parallel projection method and the perspective projection method are known techniques for creating 3D graphics, and therefore, the description is omitted.

Although embodiments of the present disclosure are described above, it is needless to say that the present disclosure is not limited to the embodiments described above, and various changes may be possible for the person skilled in the art.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

1 Image Generating Device, 2 Display Device, 3 AIS, 4 Radar, 5 Camera, 6 GNSS Receiver, 7 Gyrocompass, 8 ECDIS, 10 Processing Circuitry, 11 Input Accepting Part, 12 Data Acquiring Part, 13 Three-dimensional Object Placing Part, 14 Camera Setting Part, 15 Three-dimensional Image Generating Part, 16 Two-dimensional Object Placing Part, 17 Display Area Setting Part, 18 Two-dimensional Image Generating Part, 19 Indication Image Generating Part

The invention claimed is:

1. An image generating device, comprising:
processing circuitry configured to:
acquire ship data indicative of a two-dimensional position of a ship on a water surface,
place a three-dimensional ship object indicative of the ship, at a position of a virtual water surface in a virtual three-dimensional space corresponding to a two-dimensional position of the ship,
set a virtual camera in a bird's-eye view mode in which the three-dimensional ship object is looked down obliquely from a position higher than the three-dimensional ship object,
set a camera following mode in which the virtual camera is moved in association with movement of the three-dimensional ship object,
generate a three-dimensional image in which a sight within a field of view of the virtual camera including the three-dimensional ship object is drawn; and
an indication image generating part configured to generate an image for indication including the three-dimensional image,
wherein the ship includes a first ship to which the image generating device is provided, and a second ship that travels around the first ship, and
the processing circuitry is further configured to display, in the three-dimensional image, the three-dimensional ship object corresponding to the first ship and the three-dimensional ship object corresponding to the second ship discriminatingly from each other.

2. The image generating device of claim 1, wherein the processing circuitry is further configured to accept an operational input for moving a viewpoint by a user,
wherein the processing circuitry changes at least one of a three-dimensional position, an orientation, a viewing angle, and a magnifying power of the virtual camera according to the operational input for moving the viewpoint.

3. The image generating device of claim 2, wherein, when the operational input for moving the viewpoint is accepted, the processing circuitry changes the mode from the camera following mode to a camera fixed mode in which the virtual camera is fixed in position.

4. The image generating device of claim 3, wherein the processing circuitry
accepts the operational input for changing the viewpoint, and
sets the field of view of the virtual camera corresponding to the bird's-eye view mode, a top view mode in which the virtual water surface is looked down directly below from a position higher than the three-dimensional ship object, or a bridge view mode in which the virtual water surface is looked from a position corresponding to a control room of the three-dimensional ship object, according to the operational input for changing the viewpoint.

5. The image generating device of claim 4, wherein, when the operational input for changing the viewpoint is accepted, the processing circuitry changes the mode from the camera fixed mode to the camera following mode.

6. The image generating device of claim 2, wherein the processing circuitry is further configured to generate a two-dimensional image in which a two-dimensional ship object indicative of the ship is placed at a position corresponding to the two-dimensional position of the ship, and
wherein the processing circuitry generates the image for indication including the three-dimensional image and the two-dimensional image.

7. The image generating device of claim 6, wherein the processing circuitry sets a position corresponding to the two-dimensional position of the virtual camera as a center of the two-dimensional image.

8. The image generating device of claim 6, wherein the processing circuitry is further configured to accept an operational input for changing a display area by a user,
wherein the processing circuitry changes a display area of the two-dimensional image based on the operational input for changing the display area.

9. The image generating device of claim 6, wherein, when one of the three-dimensional ship object and the two-dimensional ship object is selected, the processing circuitry discriminatingly displays the other.

10. The image generating device of claim 6,
wherein the processing circuitry displays the two-dimensional ship object corresponding to the first ship and the two-dimensional ship object corresponding to the second ship discriminatingly from each other.

11. The image generating device of claim 6,
wherein the processing circuitry discriminatingly displays the three-dimensional ship object or the two-dimensional ship object corresponding to the second ship with a risk degree indicative of a collision risk of the first ship colliding with the second ship being more than a threshold.

12. The image generating device of claim 11, wherein the processing circuitry is further configured to warn when the second ship with the risk degree being more than the threshold is not included in the three-dimensional image.

13. The image generating device of claim 6, wherein the processing circuitry discriminatingly displays a corresponding area corresponding to a field of view of the virtual camera in the two-dimensional image.

14. The image generating device of claim 13, wherein the processing circuitry updates the corresponding area, when at least one of the three-dimensional position, the orientation, the viewing angle, and the magnifying power of the virtual camera is changed.

15. The image generating device of claim 6, wherein the processing circuitry discriminatingly displays in the three-dimensional image a corresponding area corresponding to a display area of the two-dimensional image.

16. The image generating device of claim 15, wherein the processing circuitry does not display in the three-dimensional image the three-dimensional ship object corresponding to the ship outside the display area of the two-dimensional image.

17. A ship information displaying method, comprising the steps of:
acquiring ship data indicative of a two-dimensional position of a ship on a water surface;
placing a three-dimensional ship object indicative of the ship at a position of a virtual water surface in a virtual three-dimensional space, corresponding to the two-dimensional position of the ship;
setting a virtual camera in a bird's-eye view mode in which the three-dimensional ship object is looked down obliquely from a position higher than the three-dimensional ship object;
setting a camera following mode in which the virtual camera is moved in association with movement of the three-dimensional ship object;
generating a three-dimensional image in which a sight within a field of view of the virtual camera including the three-dimensional ship object is drawn; and
displaying, by a display device, an image for indication including the three-dimensional image,
wherein the ship includes a first ship to which an image generating device is provided, and a second ship that travels around the first ship, and
the ship information displaying method further comprises displaying, in the three-dimensional image, the three-dimensional ship object corresponding to the first ship and the three-dimensional ship object corresponding to the second ship discriminatingly from each other.

18. A non-transitory computer-readable medium having stored thereon computer-executable instructions which, when executed by a computer, cause the computer to:
acquire ship data indicative of a two-dimensional position of a ship on a water surface;
place a three-dimensional ship object indicative of the ship at a position of a virtual water surface in a virtual three-dimensional space, corresponding to the two-dimensional position of the ship;
set a virtual camera in a bird's-eye view mode in which the three-dimensional ship object is looked down obliquely from a position higher than the three-dimensional ship object;
set a camera following mode in which the virtual camera is moved in association with movement of the three-dimensional ship object;

generate a three-dimensional image in which a sight within a field of view of the virtual camera including the three-dimensional ship object is drawn; and
generate an image for indication including the three-dimensional image,
wherein the ship includes a first ship to which an image generating device is provided, and a second ship that travels around the first ship, and
the computer-executable instructions further cause the computer to display, in the three-dimensional image, the three-dimensional ship object corresponding to the first ship and the three-dimensional ship object corresponding to the second ship discriminatingly from each other.

* * * * *